United States Patent
Shim

(10) Patent No.: US 6,993,424 B2
(45) Date of Patent: Jan. 31, 2006

(54) METHOD AND APPARATUS FOR CONTROLLING A SOLENOID VALVE OF AN AUTOMATIC TRANSMISSION OF A VEHICLE

(75) Inventor: Hyun Soo Shim, Gwangmyeong (KR)

(73) Assignee: Hyundai Motor Company, Seoul (KR)

( * ) Notice: Subject to any disclaimer, the term of this patent is extended or adjusted under 35 U.S.C. 154(b) by 10 days.

(21) Appl. No.: 10/747,890

(22) Filed: Dec. 29, 2003

(65) Prior Publication Data
US 2004/0254706 A1   Dec. 16, 2004

(30) Foreign Application Priority Data
May 27, 2003   (KR) ........................ 10-2003-0033683

(51) Int. Cl.
*G06F 17/00* (2006.01)
*G06F 19/00* (2006.01)

(52) U.S. Cl. ............................. 701/51; 701/66; 701/67; 477/49; 477/160; 251/129.15; 361/160

(58) Field of Classification Search ................ 701/51, 701/66, 67, 68; 192/48.2, 222; 477/49, 477/160, 163; 251/129.15, 129.08; 361/160
See application file for complete search history.

(56) References Cited

U.S. PATENT DOCUMENTS

| | | | | | |
|---|---|---|---|---|---|
| 4,620,259 | A | * | 10/1986 | Oshizawa | .................... 361/152 |
| 4,947,734 | A | * | 8/1990 | Fujita et al. | .................. 91/471 |
| 5,202,813 | A | * | 4/1993 | Uota et al. | ................... 361/154 |
| 5,404,301 | A | * | 4/1995 | Slicker | ......................... 701/60 |
| 6,122,582 | A | * | 9/2000 | Ueda | ............................ 701/51 |
| 6,208,498 | B1 | * | 3/2001 | Ueda | ........................... 361/160 |
| 6,790,160 | B2 | * | 9/2004 | Kato et al. | .................. 477/154 |

FOREIGN PATENT DOCUMENTS

| | | |
|---|---|---|
| DE | 298 09 412 U1 | 10/1998 |
| JP | 11-40416 | 2/1999 |

* cited by examiner

*Primary Examiner*—Thomas G. Black
*Assistant Examiner*—Brian J. Broadhead
(74) *Attorney, Agent, or Firm*—Morgan Lewis & Bockius LLP

(57) ABSTRACT

When a target duty of a solenoid valve of an automatic transmission of a vehicle lies in a predetermined duty range, the solenoid valve is driven for an adjusted over-excitation period obtained by adjusting a base over-excitation period on the basis of an over-excitation period adjusting value. Therefore, the solenoid valve may be normally controlled in a region in which it shows an abnormal response characteristic.

18 Claims, 5 Drawing Sheets

METHOD AND APPARATUS FOR CONTROLLING A SOLENOID VALVE OF AN AUTOMATIC TRANSMISSION OF A VEHICLE

CROSS-REFERENCE TO RELATED APPLICATIONS

This application claims priority of Korean Application No. 10-2003-0033683, filed on May 27, 2003, the disclosure of which is incorporated fully herein by reference.

FIELD OF THE INVENTION

Generally, the present invention relates to an automatic transmission of a vehicle. More particularly, the present invention relates to a method and apparatus for controlling a solenoid valve used for hydraulic pressure control of an automatic transmission.

BACKGROUND OF THE INVENTION

Typical automatic transmissions include a torque converter and a powertrain of a multiple speed gear mechanism connected to the torque converter. In addition, a hydraulic control system is provided at an automatic transmission for selectively operating at least one operational element included in the powertrain according to a running state of a vehicle.

Such a hydraulic control system of an automatic transmission achieves an appropriate shift-speed corresponding to a vehicle speed and a throttle opening, by engaging/disengaging at least one operational element by supplying hydraulic pressure generated at an oil pump.

A solenoid valve is used for such engagement/disengagement of an operational element, and such a solenoid valve is usually realized as a duty control solenoid valve. A duty control solenoid valve is usually controlled by a pulse width modulation (PWM) signal.

As shown in FIG. 5, signals for operating the solenoid valve include a duty signal for a target shift-speed determined by a predetermined shift pattern based on a vehicle speed and a throttle opening, an over-excitation signal, and a chopping signal. The solenoid valve is driven by a driving signal obtained by synthesizing the above signals.

Applied current and motion of a plunger of the solenoid valve show a relationship as shown in FIG. 6, according to its electrical characteristics. When such a moving period in the motion of the plunger of the solenoid valve is plotted with respect to 0% to 100% of the applied duty, a characteristic graph shown as in FIG. 7 can be obtained.

As shown in FIG. 7, when an applied duty is small, the motion of the plunger shows a non-linear behavior with respect to the applied duty. In this case, the moving period of the plunger becomes longer than required, so hydraulic pressure supplied to a target frictional element becomes shorter than required.

The information disclosed in this Background of the Invention section is only for enhancement of understanding of the background of the invention, and should not be taken as an acknowledgement or any form of suggestion that this information forms the prior art that is already known in this country to a person of ordinary skill in the art.

SUMMARY OF THE INVENTION

The motivation for the present invention is to provide an apparatus and method for controlling a solenoid valve of an automatic transmission of a vehicle having non-limiting advantages of enabling normal control of the solenoid valve in a range in which the solenoid valve shows an abnormal response characteristic.

An exemplary apparatus for controlling a solenoid valve of an automatic transmission of a vehicle according to an embodiment of the present invention includes a throttle opening detector for detecting a throttle valve opening of the vehicle, a vehicle speed detector for detecting a vehicle speed of the vehicle, a fluid temperature detector for detecting an automatic transmission fluid (ATF) temperature of the automatic transmission, a voltage detector for detecting an applied voltage of the solenoid valve, a shift lever position detector for detecting a shift lever position of the automatic transmission, and a transmission control unit (TCU) for controlling the solenoid valve on the basis of signals from the detectors, wherein the TCU executes a set of instructions for a method according to the present invention.

An exemplary method for controlling a solenoid valve of an automatic transmission of a vehicle according to an embodiment of the present invention includes calculating a base over-excitation period of the solenoid valve, calculating a target duty of the solenoid valve, determining if the target duty lies in a predetermined duty range, calculating an over-excitation period adjusting value of the solenoid valve when the target duty lies in the predetermined duty range, calculating a target over-excitation period of the solenoid valve on the basis of the over-excitation period adjusting value and the base over-excitation period, and realizing the target over-excitation period of the solenoid valve of the solenoid valve.

In a further embodiment, the predetermined duty range includes a duty range within which the solenoid valve operates non-linearly with respect to an applied duty.

In another further embodiment, the predetermined duty range lies within a range of less than 50%.

In a still further embodiment, the predetermined duty range includes a range of 0–30%.

In another further embodiment, an exemplary method for controlling a solenoid valve of an automatic transmission of a vehicle according to an embodiment of the present invention further includes starting operation of the solenoid valve according to the target duty, wherein the calculating the over-excitation period adjusting value is executed after starting the operation of the solenoid valve according to the target duty, and the target over-excitation period is calculated as a subtraction of the over-excitation period adjusting value from the base over-excitation period.

In a yet further embodiment, an exemplary method for controlling a solenoid valve of an automatic transmission of a vehicle according to an embodiment of the present invention includes determining if an ATF temperature satisfies a predetermined temperature condition, and determining if an applied voltage of the solenoid valve satisfies a predetermined voltage condition, wherein the calculating the over-excitation period adjusting value is executed only when the ATF temperature satisfies the predetermined temperature condition and the applied voltage of the solenoid satisfies the predetermined voltage condition.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
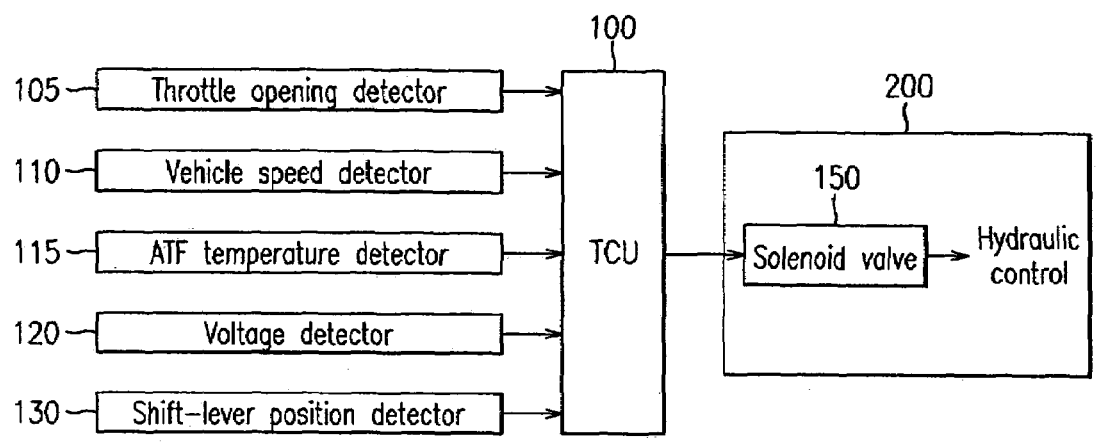
FIG. 1 is a block diagram of an apparatus for controlling a solenoid valve of an automatic transmission of a vehicle according to an embodiment of the present invention.

FIG. 1 is a block diagram of an apparatus for controlling a solenoid valve of an automatic transmission of a vehicle according to an embodiment of the present invention;

As shown in FIG. 1, an apparatus for controlling a solenoid valve of an automatic transmission of a vehicle according to an embodiment of the present invention controls a solenoid valve 150 included in an automatic transmission 200.

An apparatus for controlling a solenoid valve of an automatic transmission of a vehicle according to an embodiment of the present invention includes a throttle opening detector 105 for detecting a throttle valve opening of the vehicle, a vehicle speed detector 110 for detecting a vehicle speed of the vehicle, a fluid temperature detector 115 for detecting an automatic transmission fluid (ATF) temperature of the automatic transmission 200, a voltage detector 120 for detecting an applied voltage of the solenoid valve 150, a shift lever position detector 130 for detecting a shift lever position of the automatic transmission 200, and a transmission control unit (TCU) 100 for controlling the solenoid valve 150 on the basis of signals from the detectors 105, 110, 115, 120, and 130.

The TCU 100 can be realized by one or more processors activated by a predetermined program, and the predetermined program can be programmed to perform each step of a method according to an embodiment of this invention.

A method for controlling a solenoid valve of an automatic transmission of a vehicle according to an embodiment of the present invention is hereinafter described with reference to FIG. 2.

Figure 2:
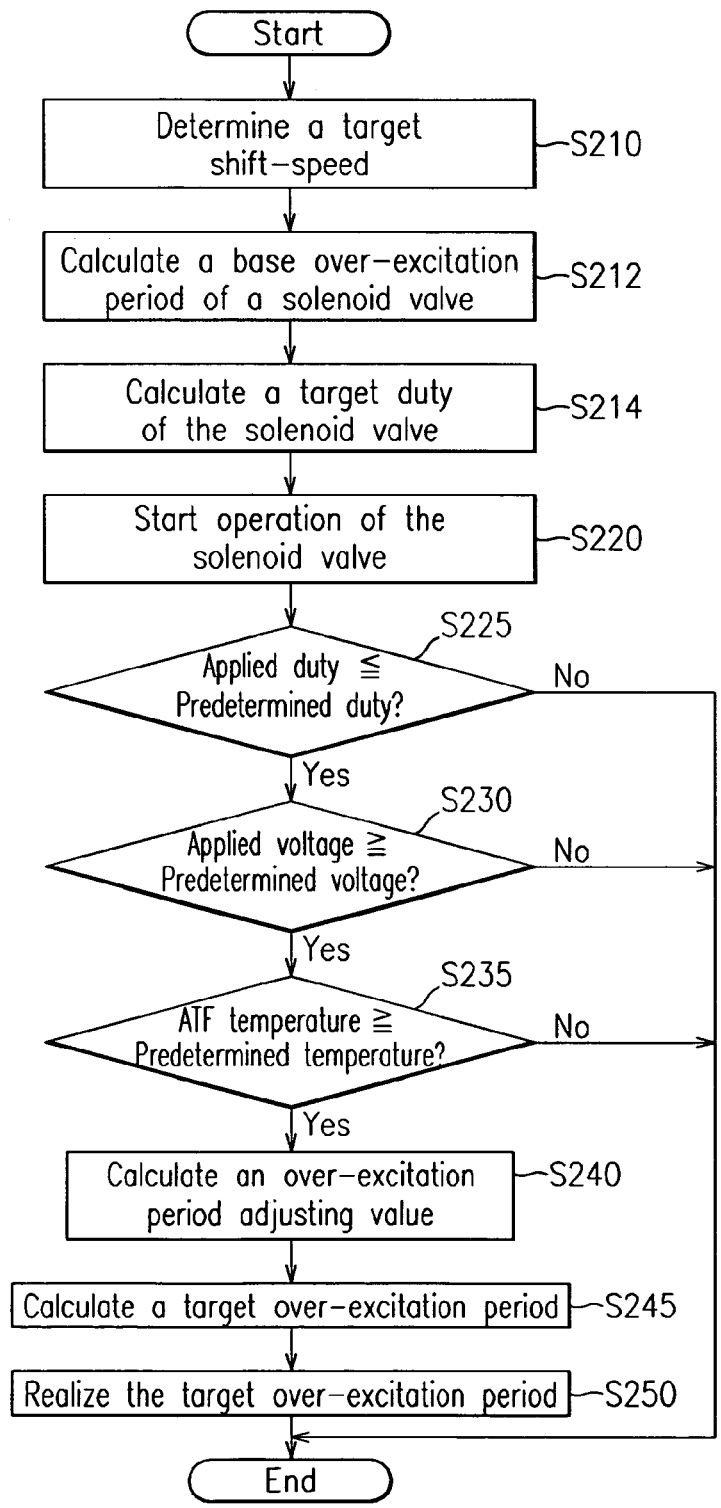
FIG. 2 is a flowchart showing a method for controlling a solenoid valve of an automatic transmission of a vehicle according to an embodiment of the present invention.

FIG. 2 is a flowchart showing a method for controlling a solenoid valve of an automatic transmission of a vehicle according to an embodiment of the present invention.

As shown in FIG. 2, firstly at step S210, the TCU 100 determines a target shift-speed on the basis of a throttle valve opening detected by the throttle opening detector 105, a vehicle speed detected by the vehicle speed detector 110, and a shift lever position detected by the shift lever position detector 130.

Accordingly, the TCU 100 calculates a base over-excitation period of the solenoid valve 150 at step S212, and then calculates a target duty of the solenoid valve 150 at step S214.

The base over-excitation period and the target duty may be calculated from a predetermined base map table, as is obvious to a person of ordinary skill in the art.

Subsequently at step S220, the TCU 100 starts operation of the solenoid valve 150 by starting over-excitation control thereof according to the base over-excitation period.

When shifting to achieve the target shift-speed by operating the solenoid valve 150 is started as such, the TCU 100 determines at step S225 if a currently output duty (i.e., the target duty of the solenoid valve 150) lies in a predetermined duty range.

The predetermined duty range is preset to include a duty range within which the solenoid valve operates non-linearly with respect to an applied duty. According to an embodiment of the present invention, the predetermined duty range lies within a range of less than 50%, and in more detail, it is preset as a range of 0–30%.

When the currently output duty does not lie in the predetermined duty range at the step S225, a method for controlling a solenoid valve according to an embodiment of the present invention is finished without adjusting the base over-excitation period.

When the currently output duty satisfies the predetermined duty range at the step S225, the TCU 100 determines, at step S230, if a currently output voltage (i.e., the applied voltage of the solenoid valve 150) satisfies a predetermined voltage condition.

When the currently output voltage does not satisfy the predetermined voltage condition at the step S230, a method for controlling a solenoid valve according to an embodiment of the present invention is finished without adjusting the base over-excitation period.

When the currently output voltage satisfies the predetermined voltage condition at the step S230, the TCU 100 determines, at step S235, if the ATF temperature satisfies a predetermined temperature condition.

When the ATF temperature does not satisfy the predetermined temperature condition at the step S230, a method for controlling a solenoid valve according to an embodiment of the present invention is finished without adjusting the base over-excitation period.

According to an embodiment of the present invention, the predetermined voltage condition is set as the applied voltage of the solenoid valve 150 being above or equal to a predetermined voltage, and the predetermined temperature condition is set as the ATF temperature being above or equal to a predetermined temperature.

When the ATF temperature satisfies the predetermined temperature condition at the step S235, the TCU 100 calculates, at step S240, an over-excitation period adjusting value of the solenoid valve 150.

The over-excitation period adjusting value may be obviously set with respect to a specific solenoid valve experimentally by a person of ordinary skill in the art.

Subsequently at step S245, the TCU 100 calculates a target over-excitation period of the solenoid valve on the basis of the over-excitation period adjusting value and the base over-excitation period, and subsequently at step S250, the TCU 100 realizes the target over-excitation period of the solenoid valve of the solenoid valve 150.

The target over-excitation period (refer to S245) may be calculated at the step S245 by subtracting the over-excitation period adjusting value from the base over-excitation period.

The target over-excitation period may be realized as the TCU 100 activates the solenoid valve 150 by the target over-excitation period, i.e., as the TCU 100 activates it as shorter than the base over-excitation period as the over-excitation period adjusting value.

Figure 3:
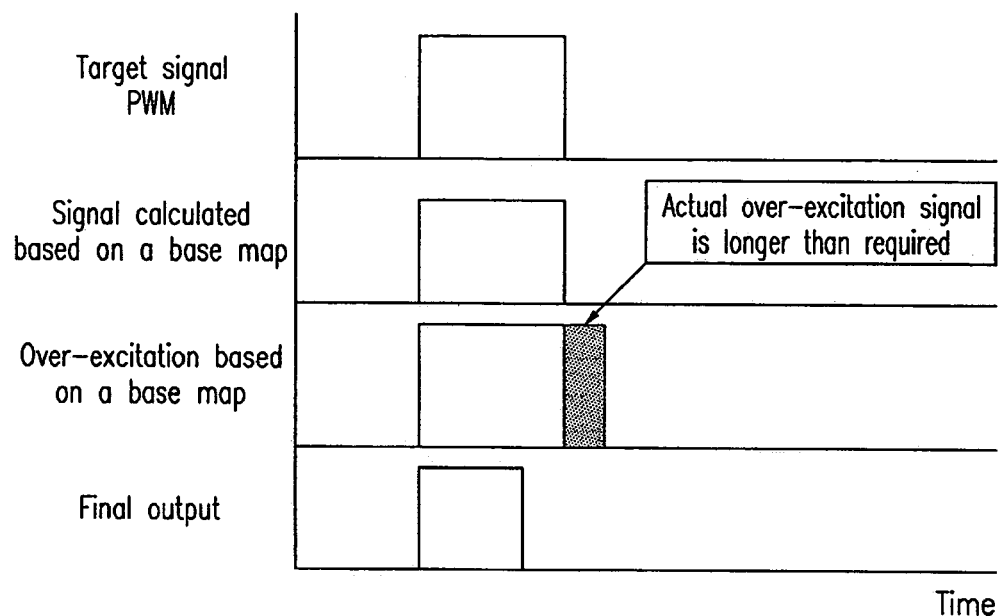
FIG. 3 is a timing diagram of signals used in a method for controlling a solenoid valve of an automatic transmission of a vehicle according to an embodiment of the present invention.

In more detail, as shown in FIG. 3, when the base over-excitation period for engaging a target shift-speed is calculated from the base map table in accordance with a current vehicle running state, such a base over-excitation period may cause a time delay in a motion of the solenoid valve 150 from a required motion. Therefore, such a base over-excitation period is adjusted in order to compensate for such a time delay such that a required operation of the solenoid valve 150 may be achieved by driving the solenoid valve with such a compensated over-excitation period.

According to such an adjustment of the over-excitation period, when a motion of a plunger of a solenoid valve is offset or deviated from a required motion, such an offset or a deviation may be compensated by reducing a peak driving period (i.e., the over-excitation period) of the solenoid valve.

Figure 4:
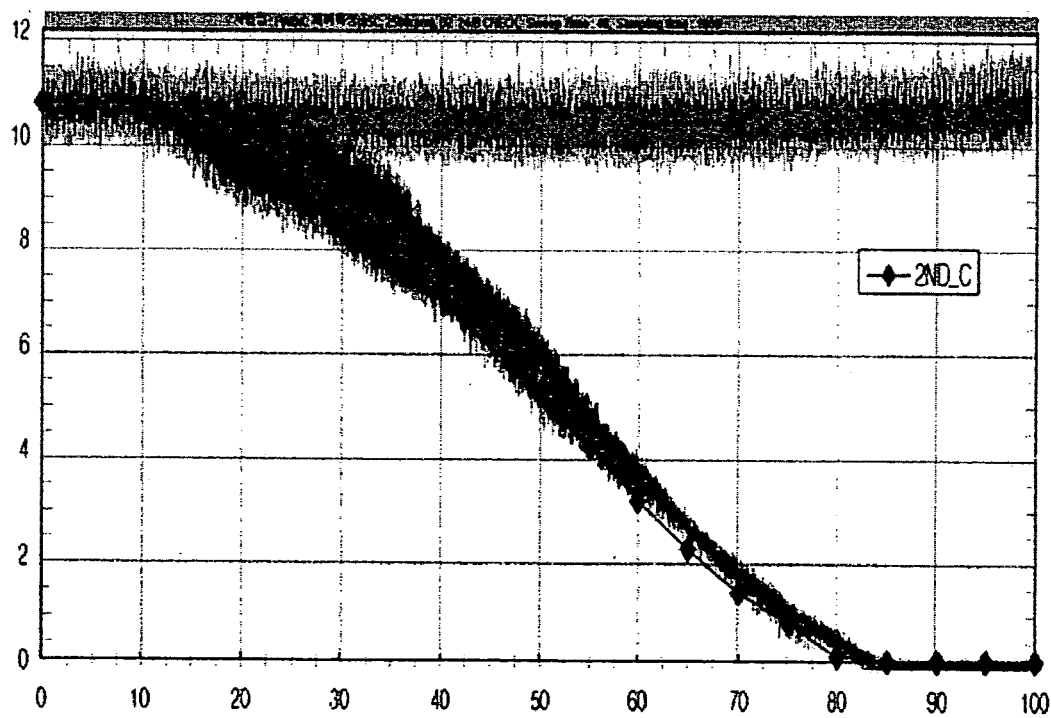
FIG. 4 is a graph for showing an effect of a method for controlling a solenoid valve of an automatic transmission of a vehicle according to an embodiment of the present invention.
Figure 5:
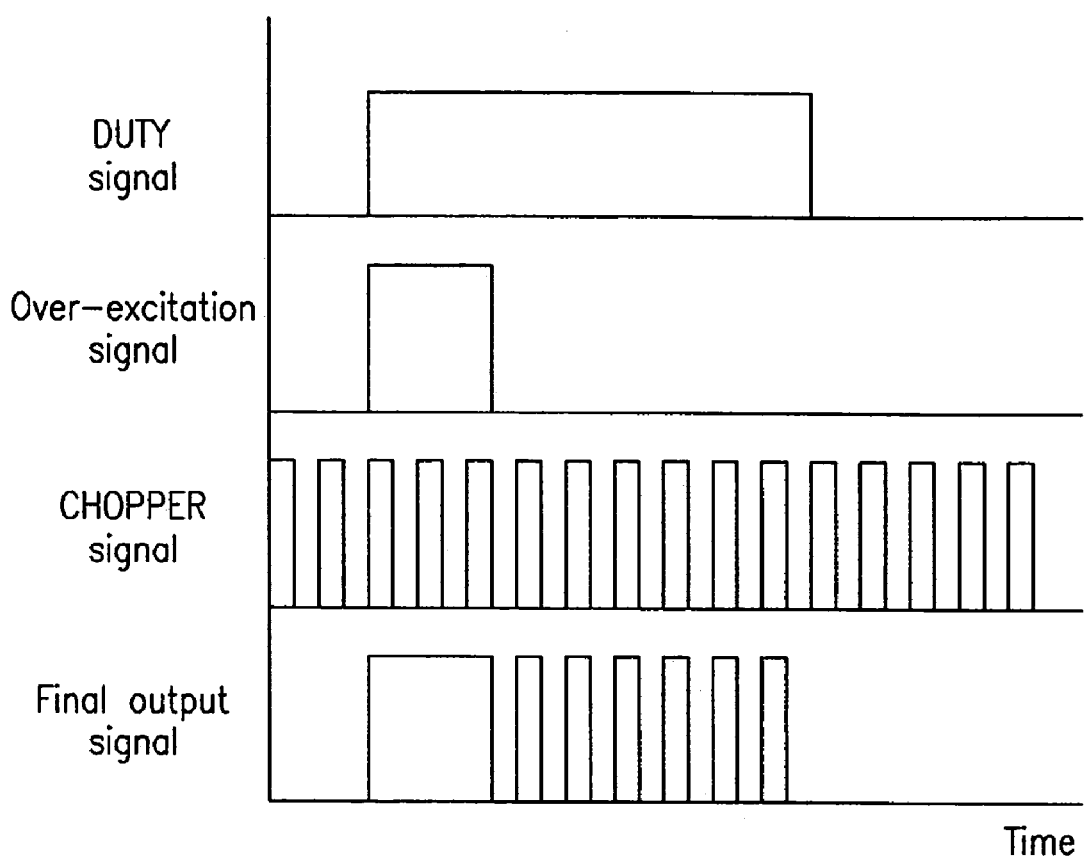
FIG. 5 is a timing diagram of signals used in a conventional method for controlling a solenoid valve of an automatic transmission of a vehicle.
Figure 6:
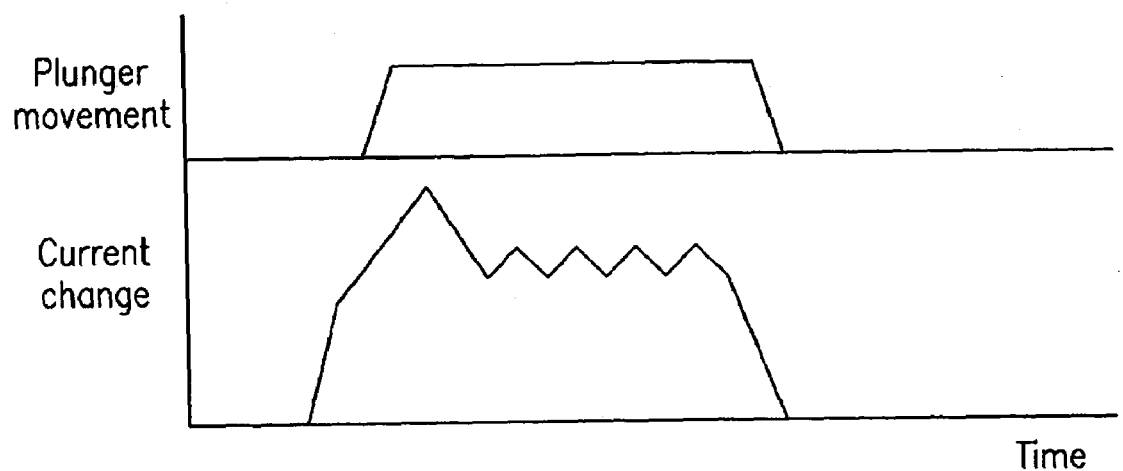
FIG. 6 is a graph for showing a relationship between an applied current and a motion of a plunger in a general method for controlling a solenoid valve of an automatic transmission.
Figure 7:
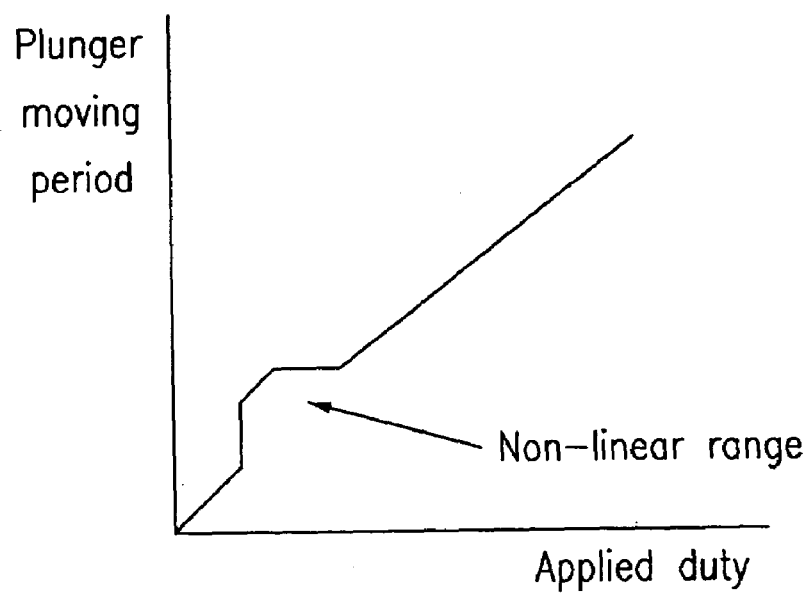
FIG. 7 is a graph for showing characteristics of a moving period of a plunger of a solenoid valve with respect to an applied duty.

According to an embodiment of the present invention, as shown in FIG. 4, a hydraulic pressure may be controlled as required by adjusting control of the over-excitation of a solenoid valve, especially when a required duty lies in a range of 10–30%.

As described above, according to an embodiment of the present invention, when an output duty for a solenoid valve lies in a range in which a motion of a plunger of a solenoid valve shows a non-linear response characteristic, a control parameter is adjusted such that the motion of the plunger becomes as required, and accordingly a stable characteristic in a hydraulic pressure control may be achieved and a shift control of an automatic transmission becomes more stable and reliable.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling a solenoid valve of an automatic transmission of a vehicle, the method comprising:
    calculating a base over-excitation period of the solenoid valve;
    calculating a target duty of the solenoid valve;
    determining if the target duty lies in a predetermined duty range;
    calculating an over-excitation period adjusting value of the solenoid valve when the target duty lies in the predetermined duty range;
    calculating a target over-excitation period of the solenoid valve on the basis of the over-excitation period adjusting value and the base over-excitation period; and
    realizing the target over-excitation period of the solenoid valve of the solenoid valve.

2. The method of claim 1, wherein the predetermined duty range comprises a duty range within which the solenoid valve operates non-linearly with respect to an applied duty.

3. The method of claim 1, wherein the predetermined duty range lies within a range of less than 50%.

4. The method of claim 3, wherein the predetermined duty range comprises a range of 0–30%.

5. The method of claim 1, further comprising a starting operation of the solenoid valve according to the target duty,
    wherein the calculating the over-excitation period adjusting value is executed after the starting operation of the solenoid valve according to the target duty, and
    the target over-excitation period is calculated as a subtraction of the over-excitation period adjusting value from the base over-excitation period.

6. The method of claim 5, wherein the predetermined duty range comprises a duty range within which the solenoid valve operates non-linearly with respect to an applied duty.

7. The method of claim 5, wherein the predetermined duty range lies within a range of less than 50%.

8. The method of claim 7, wherein the predetermined duty range comprises a range of 0–30%.

9. The method of claim 1, further comprising:
    determining if an ATF temperature satisfies a predetermined temperature condition; and
    determining if an applied voltage of the solenoid valve satisfies a predetermined voltage condition,
    wherein the calculating the over-excitation period adjusting value is executed only when the ATF temperature satisfies the predetermined temperature condition and the applied voltage of the solenoid satisfies the predetermined voltage condition.

10. An apparatus for controlling a solenoid valve of an automatic transmission of a vehicle, comprising:
    a throttle opening detector for detecting a throttle valve opening of the vehicle;
    a vehicle speed detector for detecting a speed of the vehicle;
    a fluid temperature detector for detecting an automatic transmission fluid (ATF) temperature of the automatic transmission;
    a voltage detector for detecting an applied voltage of the solenoid valve;
    a shift lever position detector for detecting a shift lever position of the automatic transmission; and
    a transmission control unit (TCU) for controlling the solenoid valve on the basis of signals from each of the detectors,
    wherein the TCU executes a set of instructions for a method comprising:
    calculating a base over-excitation period of the solenoid valve;
    calculating a target duty of the solenoid valve;
    determining if the target duty lies in a predetermined duty range;
    calculating an over-excitation period adjusting value of the solenoid valve when the target duty lies in the predetermined duty range;
    calculating a target over-excitation period of the solenoid valve on the basis of the over-excitation period adjusting value and the base over-excitation period; and
    realizing the target over-excitation period of the solenoid valve of the solenoid valve.

11. The apparatus of claim 10, wherein the predetermined duty range comprises a duty range within which the solenoid valve operates non-linearly with respect to an applied duty.

12. The apparatus of claim 10, wherein the predetermined duty range lies within a range of less than 50%.

13. The apparatus of claim 12, wherein the predetermined duty range comprises a range of 0–30%.

14. The apparatus of claim 10, further comprising starting operation of the solenoid valve according to the target duty,
wherein the calculating the over-excitation period adjusting value is executed after starting the operation of the solenoid valve according to the target duty, and
the target over-excitation period is calculated as a subtraction of the over-excitation period adjusting value from the base over-excitation period.

15. The apparatus of claim 14, wherein the predetermined duty range comprises a duty range within which the solenoid valve operates non-linearly with respect to an applied duty.

16. The apparatus of claim 14, wherein the predetermined duty range lies within a range of less than 50%.

17. The apparatus of claim 16, wherein the predetermined duty range comprises a range of 0–30%.

18. The apparatus of claim 10, wherein the TCU further executes instructions for:
determining if an ATF temperature satisfies a predetermined temperature condition; and
determining if an applied voltage of the solenoid valve satisfies a predetermined voltage condition,
wherein the calculating the over-excitation period adjusting value is executed only when the ATF temperature satisfies the predetermined temperature condition and the applied voltage of the solenoid satisfies the predetermined voltage condition.

* * * * *